May 11, 1954
R. THOMSON
2,678,358
TURN SIGNAL FOR AUTOMOBILES
Filed May 26, 1952
3 Sheets-Sheet 1
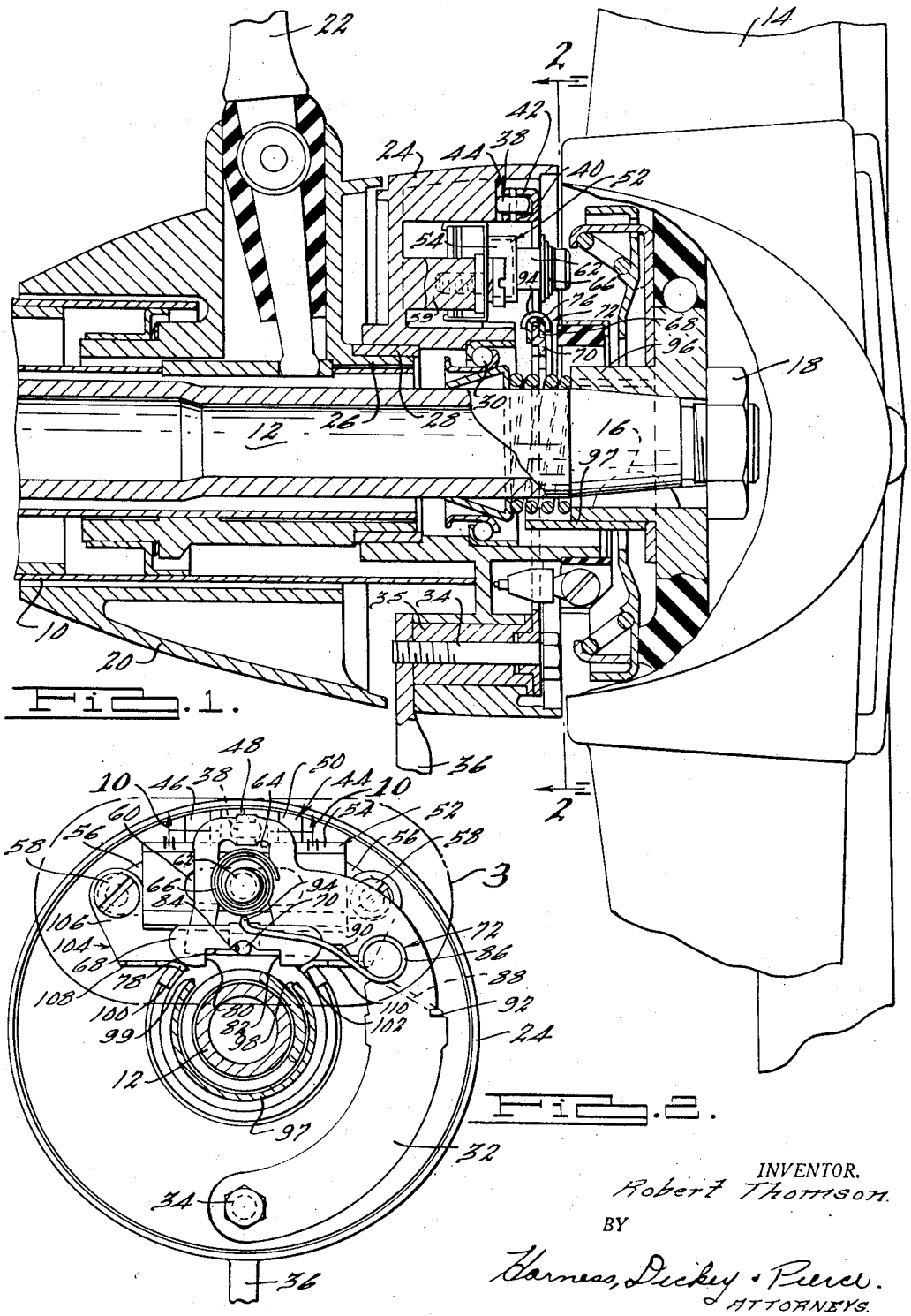
INVENTOR.
Robert Thomson
BY
Harness, Dickey & Pierce.
ATTORNEYS.

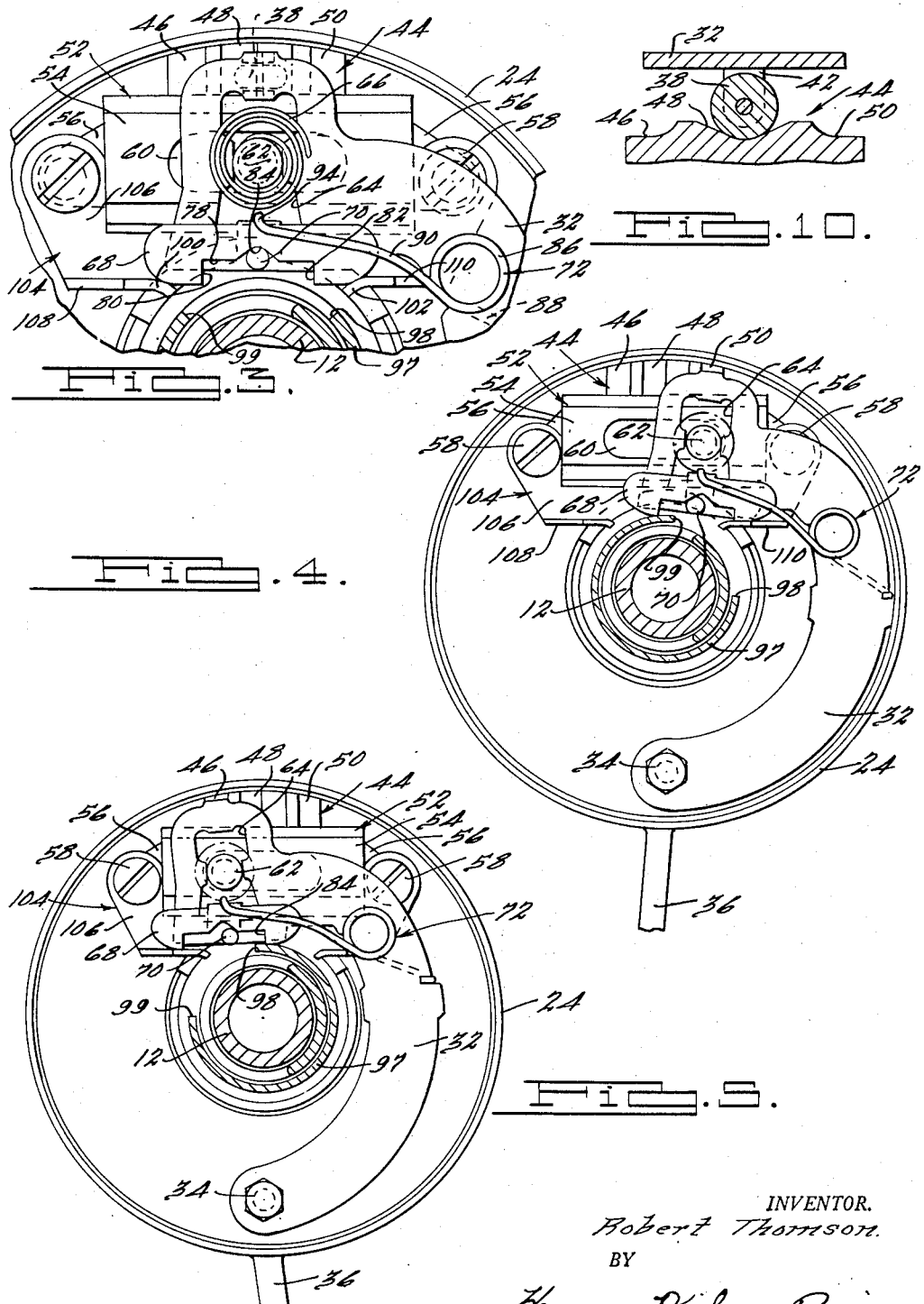

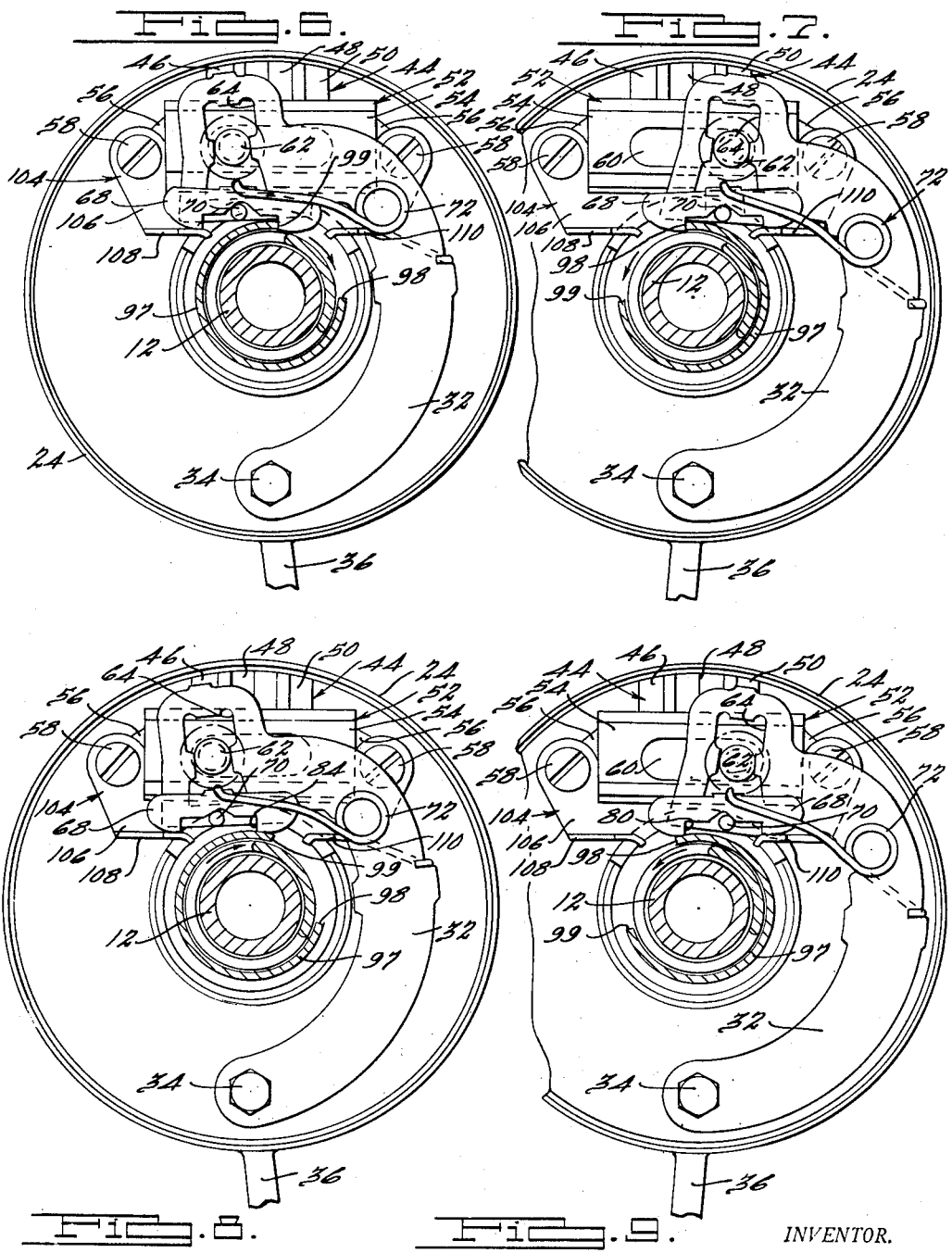

Patented May 11, 1954

2,678,358

UNITED STATES PATENT OFFICE 2,678,358

TURN SIGNAL FOR AUTOMOBILES

Robert Thomson, Detroit, Mich., assignor to Ainsworth Manufacturing Corporation, Detroit, Mich., a corporation of Michigan Application May 26, 1952, Serial No. 289,957

6 Claims. (Cl. 200—61.35)

This invention relates to new and useful improvements in turn-indicator devices of the type adapted for use in automotive vehicles and the like.

This invention is concerned primarily with turn-indicators of the type shown in the Wharam Patent No. 2,269,499 which has a generally circular housing fastened to the steering column directly below the steering wheel. Within the housing is a pivoted, manually operable actuator arm which operates a switch electrically connected to two direction-indicating lights (usually the taillights) on the vehicle. The switch is open in a neutral position of the arm. When the arm is moved in one direction the switch closes a blinker circuit to one direction-indicating light and when the arm is moved in the opposite direction the switch closes a blinker circuit to the other direction-indicating light. On the distal end of the switch-operating arm is a pawl or dog mounted to rock about a pivot and normally held yieldably against the pivot by a spring. Spaced shoulders at the inner side of the pawl co-operate with the ends of a C ring fastened on and turnable with the steering wheel to return the device to a neutral or inoperative position automatically after each operation thereof.

The above construction is subject to the disadvantage that when the device is in its normal inoperative position, the two shoulders on the pawl must clear the C ring, which cancels out or neutralizes the turn indicator but the clearance between the shoulders and the C ring must be relatively slight as the pawl must be moved into the path of the C ring by relatively small movement of the actuator arm. As a result of these critical relationships, permissible manufacturing tolerances sometimes cause the pawl to contact the C ring when the device is in neutral position, and this produces an objectionable scratching or scraping noise. Conversely, reverse accumulation of manufacturing tolerances may space the shoulders of the pawl so far from the C ring that the pawl does not properly engage the ring when the device is operated to indicate a turn.

As a practical matter the parts of the turn-indicator device must be made from inexpensive stamped sheet metal parts in order to compete economically, and it is not commercially practicable to hold the mentioned parts to the fine tolerances necessary to eliminate the above difficulties. On the other hand, the disadvantages of the prior art construction have resulted in an excessive number of unsatisfactory or inoperative devices, an inordinate number of rejects and undue expense and waste.

It is an important object of this invention to devise a turn-indicator device of the above type which is uniquely constructed to obviate the disadvantages specifically pointed out above.

In the drawings forming a part of this specification and wherein like numerals are employed to designate like parts throughout the same:

Fig. 1 is a longitudinal sectional view through the steering column and associated parts of an automotive vehicle and showing a turn-indicator device embodying the present invention associated therewith, Fig. 2 is a transverse sectional view taken on the line 2—2 of Fig. 1 and illustrating the turn indicator in a neutral, inoperative position, Fig. 3 is an enlarged, fragmentary view of the portion of Fig. 2 enclosed in the circle 3, Fig. 4 is a view similar to Fig. 2 but showing the turn indicator positioned to indicate a right turn and illustrating the manner in which the steering actuator overrides when the steering wheel is rotated in a counterclockwise direction in making the turn, Fig. 5 is a view similar to Fig. 4 but illustrating the steering override when the turn indicator is positioned to indicate a left turn, Fig. 6 is a view similar to Fig. 4 but illustrating the manner in which the steering actuator coacts with the turn indicator as the steering wheel is rotated in a clockwise direction after making a left turn so as to cancel the turn signal and to return the device to the initial neutral position, Fig. 7 is a view similar to Fig. 5 but illustrating how the steering actuator coacts with the turn indicator after making a right turn to cancel the turn signal and return the device to the initial neutral position, Fig. 8 is a view similar to Fig. 6 but illustrating a safety override feature of the turn indicator which permits the interengaging parts of the indicator and the steering actuator to disengage and thus prevent locking of the steering wheel in the event canceling of the signal is prevented as by someone holding the indicator mechanism manually to prevent canceling, Fig. 9 is a view similar to Fig. 7 but illustrating the safety override feature as in Fig. 8 with the parts positioned to indicate a right turn, and Fig. 10 is a fragmentary sectional view taken on the line 10—10 of Fig. 2.

As indicated above, this invention is an improvement in a conventional turn indicator device of the type illustrated in the Wharam et al. patent supra. In the instant invention, however, the device is reconstructed so as to rock the pawl of the indicator into the path of the steering actuator and the pivotal actuation of the pawl is accomplished by the relatively small movement of the manually operated actuator arm. Specifically, the instant invention provides cams at the ends of the pawl. When the device is operated to indicate a turn, one end of the pawl rides on one of the cam surfaces and the opposite end thereof is swung inwardly into the path of the steering actuator. By positioning the cams as described, the pawl can be spaced initially far enough from the steering actuator so that there can not possibly be any contact between these parts even though the manufacturing tolerances accumulate adversely to this end. As a consequence, objectionable noise and scraping sounds sometimes found in current turn indicators of this type are entirely eliminated. At the same time, proper interengagement of the pawl and the steering actuator is assured, and this is done without increasing the size of the device or the movement of the manual actuator. The pawl engages the steering actuator even though the manufacturing tolerances accumulate to provide maximum spacing between the parts. All of this is accomplished without radical change in the existing mechanism so that the novel structure adds very little to the total cost of the device.

Reference is now had to the accompanying drawings wherein the numeral 10 designates a steering column of an automotive vehicle. A steering shaft 12 extends centrally through and is suitably journaled for rotation in the steering column 10, and, according to conventional practice, a steering wheel 14 is fastened on the upper end of the steering column by a key 16 and nut 18. A rotatable housing 20 journaled in the upper end of steering column 10 carries the usual gearshift lever 22 and encloses parts of the gearshift mechanism associated with the lever.

The turn-indicator device of this invention comprises a stationary annular case 24 interposed between the steering wheel 14 and the housing 20 and suitably fastened to parts of the steering column assembly in the conventional manner. The case 24 also journals an upwardly extending hub 26 on the housing 20, and a suitable bearing 28 preferably is interposed therebetween to assure relatively frictionless rotation. A bearing 30 interposed between the case and the steering shaft 12 supports the upper end of the shaft during turning of the steering wheel 14.

In the annular interior of the case 24 is a generally semicircular arm 32, and one end of the arm is fixed to a pivot 34 in a bearing 35 at one side of the case. A manually operable lever 36 also is fixed to the pivot 34 and the lever 36 extends radially outwardly from the case usually laterally to the left of the steering column 10 and under the steering wheel 14. Actuation of the lever 36 swings the arm 32 back and forth through a limited arc within the case 24. The arm 32 preferably is made of sheet metal by conventional stamping and forming operations. A small roller 38 is journaled on the distal end at the outer side of the arm. As perhaps best shown in Fig. 1, the roller 38 is disposed below the arm 32 and is journaled between spaced tabs 40 and 42 struck and bent downwardly from the arm. The roller 38 rides on a cam 44 having three laterally spaced and aligned generally V-shaped valleys or depressions 46, 48, and 50 (Fig. 10). The depressions 46, 48, and 50 hold the roller 38 in a predetermined position at the bottom of the depression. Normally, the device is in neutral position with the roller 38 disposed in the middle depression 48 as shown in Fig. 2. When the lever 36 is pulled downwardly to indicate a left turn, roller 38 is moved out of the middle depression 48 and into the end depression 46 which then holds the arm 32 and the associated lever 36 in the adjusted position until the parts are returned to the initial neutral position either manually or automatically as hereinafter described. Conversely, when the lever 36 is pushed upwardly to indicate a right turn, roller 38 is moved out of the middle depression 48 and into the end depression 50 which then operates in the same manner as depression 46 to hold the arm 32 and associated parts in the adjusted position.

Also disposed below the distal end of arm 32 is a conventional three-position switch 52 which is adapted to be connected in the electrical circuit of the vehicle to control the turn-indicating signals (usually the taillights of the vehicle). The switch 52 of the type here shown has an outer case 54 which is fastened by end lugs 56 and screws 58 to bosses 59 upstanding from the bottom of the case 24 and an inner sliding member 60 which carries an upwardly extending actuator stud 62. The stud 62 extends upwardly through a transverse elongated slot 64 in the arm 32. A spiral spring 66 overlying the arm 32 is fastened at one end to the stud, and this spring holds the roller 38 pressed downwardly against the cam 44. When the arm 32 is in neutral position as shown in Fig. 2, the contacts of switch 52 are open. When the lever 36 is moved downwardly to indicate a left turn, a contact (not shown) is closed in the switch 52 completing a blinker circuit to the left taillight which then flashes off and on to indicate the turn. Alternatively, movement of the lever 36 upwardly to indicate a right turn closes another contact (not shown) in the switch 52 completing a blinker circuit to the right taillight which then flashes to indicate a right turn.

Also mounted on the distal end of arm 32 is a pivoted pawl 68. In the particular construction here shown, an upstanding pivot 70 is provided on the inner half of arm 32, and the pawl 68 supported on the arm 32 is urged edgeways against the pivot by a spring 72. The particular pivot 70 here shown is pressed upwardly from the material of the arm 32 by a conventional die-forming operation to provide an integral construction having sufficient strength to withstand the constant pressure imposed laterally against the pivot by the spring 72. The pawl 68 preferably is formed from sheet metal and the rearward edge thereof has a tab 76 which extends downwardly through the slot 64 and under the arm 32 to hold the pawl on the arm. In this connection it will be observed that the tab 76 prevents pawl 68 from being lifted bodily from the arm 32 but it fits the arm relatively loosely and permits the pawl to slide back and forth on the arm relative to the pivot 70. The bearing edge of pawl 68 is formed with a recess 78 at substantially the middle thereof and the recess defines spaced shoulders 80 and 82. At the middle of recess 78 is a substantially V-shaped notch 84 which receives the pivot 70 and holds the pawl properly positioned on the pivot. The spring 72 has a coiled or helical middle portion 86 and terminal portions 88 and 90. The terminal portion 88 extends away from pawl 68 and under the arm 32, and this portion of the spring 72 is fastened in a notch 92 provided in the outer edge of arm 32. The terminal portion 90 overlies the pawl and the extreme end portion thereof is hooked around the rearward tab 76 of the pawl as at 94 to hold the spring in fixed association with the pawl.

Surrounding and fixed to a central hub 96 on the steering wheel 14 is a sleeve 97 which extends downwardly into the case 24 and constitutes an actuator for canceling the turn indicator, viz., for returning it to its initial neutral position automatically after operation thereof to indicate a right turn or a left turn. As shown in Fig. 2, approximately one fourth of that portion of the sleeve which extends to the case 24 is cut away to provide longitudinal edges 98 and 99, and it is this portion of the sleeve which actuates the turn-indicator device. In effect the actuator is in the form of a C ring. The pawl 68 is disposed laterally of the actuator 97 but the latter is disposed in close proximity to the pawl and to the shoulders 80 and 82. In fact, when the steering wheel 14 is rotated to move the cut-away portion of the actuator 97 away from the recess 78 the actuator actually extends into the recess 78 barely clearing the two shoulders 80 and 82.

According to the present invention, a pair of cams 100 and 102 are provided at opposite ends of the pawl 68. In the particular construction shown the cams 100 and 102 are part of a formed sheet-metal plate 104 having a flat base portion 106 which extends under the switch 52 and is fastened securely to embossments 59 by screws 58. Upstanding from the inner edge of base portion 106 and at opposite sides thereof are flanges 108 and 110, and the cams 100 and 102 are formed by bending the terminal portions of the flanges 108 and 110 inwardly as perhaps best shown in Fig. 2. By reason of this arrangement pivotal movement of the arm 32 to the left as viewed in Fig. 2 to indicate a left turn brings the left-hand end of pawl 68 against cam 100 and causes the mentioned end of the pawl to ride outwardly on the cam so as to rotate the pawl on pivot 70 and to swing the right-hand end of the pawl inwardly into the path of travel of actuator 97. Conversely, pivotal movement of arm 32 to the right, as viewed in Fig. 2, to indicate a right turn causes the right-hand end of pawl 68 to ride outwardly on cam 102 so as to rotate the pawl on pivot 70 and to swing the left-hand end thereof into the path of travel of actuator 97.

In the prior art construction, the pawl 68 was not mounted for pivotal movement but rather seated forwardly on an upstanding, relatively long and flat abutment formed on or attached to the arm 32. The abutment extended substantially entirely across the recess 78 and while the pawl was free to move away from the abutment it was not mounted for pivotal movement thereon. The slight movement afforded by arm 32 alone was relied upon to bring the shoulders 80 and 82 into the path of travel of the steering wheel actuator.

As pointed out above, the relatively small movement permitted arm 32 sometimes was not sufficient to position the pawl 68 for proper engagement with actuator 97; or, conversely, the pawl was initially positioned so close to the actuator that the inner edges of shoulders 80 and 82 engaged the actuator 97 and produced objectionable scratching noises. All of these difficulties were due to permissible variations in the structure caused by manufacturing tolerances normally allowed for relatively inexpensive stamped sheet metal parts of the type here employed.

The cams 100 and 102, provided by the instant construction, amplify movement of arm 32 sufficiently so that the pawl 68 can be initially spaced far enough from the actuator 97 to assure adequate clearance therebetween regardless of manufacturing tolerances and variations in assembly but assures proper engagement between the pawl and the actuator whenever the turn indicator is actuated. The instant construction therefore effects a better operation, reduces the number of rejects, and thus achieves a substantial saving in material and manufacturing costs.

The operation of the device is as follows:

When the turn indicator is in the neutral position shown in Figs. 2 and 3, the steering-wheel actuator 97 is free to turn any amount without contacting the pawl 68. The turn indicator normally is operated substantially before the turn is made and while the steering wheel 14 is positioned to direct the front wheels straight ahead. In this position of the steering wheel 14, the actuator 97 is disposed as shown in Fig. 3 with the cut-away portion thereof facing pawl 68.

When the turn indicator is positioned as shown in Fig. 4 to indicate a right turn, the right-hand end of pawl 68 rides upon cam 102 and the left-hand end of the pawl is swung about pivot 70 into the cut-away portion of the actuator 97. At the same time that the arm 32 is moved to the right, switch 52 of course completes a circuit to the right-hand taillight which begins to blink, indicating the driver's intention of making a right turn. Then, when the steering wheel 14 is rotated to make the turn, actuator 97 merely pushes the pawl 68 away from pivot 70 without affecting the adjusted position of the turn indicator mechanism (Fig. 4). However, when the steering wheel 14 is straightened out after making the turn, the first rotation of the wheel 14 to the left brings the edge 98 of actuator 97 squarely into abutting engagement with the shoulder 80 on pawl 68 as shown in Fig. 7, and continued rotation of the steering wheel 14 thereafter returns the arm 32 to its initial neutral position thus canceling the turn signal. When the arm 32 is again in neutral position the steering wheel 14 of course may be rotated any number of turns in either direction without contacting the pawl 68.

A comparable situation obtains when the arm 32 is moved to the left to indicate a left turn, as shown in Figs. 5 and 6. The actuator 97 overrides the pawl 68 when the turn is being made (Fig. 5) and the edge 99 thereof engages shoulder 84 of the pawl to cancel the signal when the steering wheel 14 is straightened after making the turn (Fig. 6).

The instant construction preserves the safety override feature necessary in a device of this kind to prevent the steering wheel 14 from locking in the turned position and to prevent parts of the turn indicator mechanism from being damaged in the event the arm 32 becomes jammed or is otherwise prevented from returning to the neutral position after operation of the device to indicate a turn. This may happen in a number of different ways, as by the operator of the car, or someone riding beside him, holding the lever 68 in a "turn" position. In this connection it will be observed that if the edge 99 of actuator 98 engages shoulder 84 to cancel the turn signal and the arm 32 will not return for some reason, pressure exerted by the edge 99 against shoulder 84 merely causes the pawl 68 to spring back from pivot 70, as shown in Fig. 8. The steering wheel 14 thus cannot lock in making the turn. In the same manner, any force tending to hold arm 32 in the position shown in Fig. 9 will not lock the steering wheel 14 as the pressure exerted by edge 98 against shoulder 80 merely causes the pawl 68 to spring backward away from pivot 70.

It may thus be seen that I have achieved the objects of my invention. I have provided an improved turn-indicator device for automotive vehicles that is better constructed and more efficient in operation than prior conventional devices of the same type, and I have accomplished these advantages at an almost insignificant increase in the cost of the mechanism.

Having thus described the invention, I claim:

1. A turn-indicator device for automotive vehicles of the type having a steering shaft rotatably mounted in a steering column and a steering wheel fastened on the shaft, and an actuator having spaced operating parts on, rotatable with and depending from the steering wheel, said device comprising a case adapted for attachment to the steering column immediately below the steering wheel so as to receive said actuator and having a central opening to accommodate said steering shaft, a manually operable pivoted arm having a part thereof disposed in said case, said part being arcuate to circumvent the steering shaft and said arm being rockable on its pivot to swing said part in an arcuate path, a switch adapted to be connected in the electrical circuit of the vehicle having a switch operator engaged with and operated by said part, means co-operable with said part for holding the same and said switch in different selected positions, a pivot on said part disposed radially outwardly of said actuator, a pawl mounted on said pivot and movable bodily radially with respect to said steering shaft relative to the pivot and to said actuator, said pawl having spaced shoulders adapted in one position of the arm to accommodate said actuator therebetween, spring means biasing said pawl radially inwardly against said pivot and operative to yieldingly resist bodily movement of the pawl away from the pivot, and cam members in the case at the inner side of said pawl, each engageable with a respective end of said pawl and operable to rock the latter about said pivot to swing the opposite end of said pawl into the path of travel of said actuator when said projection is moved in the direction of said cam member from said one position.

2. A turn-indicator device for automotive vehicles comprising a case having a central opening therein, a manually operable pivoted arm having an arcuately curved part extending into the case and around said opening, a switch having an actuator engaged with and operated by said part, means co-operable with said part for holding the same and said switch in different selected positions, a pivot on said part, an element mounted on said pivot and movable bodily relative thereto and radially with respect to said opening having spaced shoulders extending radially inwardly toward said opening, spring means biasing said element inwardly against said pivot, and stationary cam members in the case, each of said cam members being engageable with a respective end of said element and operable to rock the latter about said pivot when said part is moved in the direction of said cam member from said one position.

3. A turn-indicator device including a pivoted switch-actuating arm provided with an upstanding pivot, and a spring-biased element rockable about said pivot and having spaced shoulders adapted to engage a switch-operating member, said element being movable bodily relative to said pivot and radially to and from said switch-operating member, cam members at opposite ends and in front of said element limiting movement of the element in the direction of said switch-operating element and normally holding the same out of engagement with said switch-operating member, said element being engageable with one of said cams when the arm is pivoted in one direction and engageable with the other of said cams when the arm is pivoted in the opposite direction, each cam being arranged so that engagement thereof by the adjacent end of said element operates to rock said element about said pivot and to swing the other end of said element into the path of said switch-operating member.

4. A turn-indicator device for automotive vehicles of the type having a steering shaft rotatably mounted in a steering column, and an actuator having spaced switch-operating elements on, rotatable with and depending from the steering wheel, said device comprising a case adapted for attachment to the steering column immediately below the steering wheel so as to receive said actuator and having a central opening to accommodate said steering shaft, a manually operable pivoted arm having a part extending in said case, said part being arcuate to circumvent the steering shaft and said arm being rockable on its pivot to swing said part in an arcuate path, a switch adapted to be connected in the electrical circuit of the vehicle having an actuator engaged with and operated by said part, means co-operable with said part for holding the same and said switch in different selected positions, a pivot on said part, a pawl mounted on said pivot and movable bodily relative thereto and radially with respect to said central opening, said pawl having spaced shoulders adapted in one position of the arm to accommodate said actuator therebetween, spring means biasing said pawl inwardly against said pivot, and a plate fastened to the case under said part, said plate having upstanding flanges arranged in front of and engageable with said pawl adjacent the ends thereof to limit movement of the pawl in the direction of said actuator, parts of said flanges being curved to define cam surfaces, and said cam surfaces being arranged so that pivotal movement of the arm from said one position moves one end of said element against the adjacent cam and swings the opposite end thereof inwardly to position the shoulder at said opposite end in the path of the switch-operating elements of said actuator.

5. A turn-indicator device for automotive vehicles comprising a case having a central opening therein, a manually operable pivoted arm having an arcuately curved part extending into the case and around said opening, a switch having an actuator engaged with and operated by said part, means co-operable with said part for holding the same and said switch in different selected positions, a pivot on said part, a pawl mounted on said pivot and movable bodily relative thereto and radially with respect to said opening, said pawl having spaced shoulders extending toward said opening, spring means biasing said pawl inwardly against said pivot, and a plate member fastened to the case under said part provided with upstanding flanges disposed in front of and engageable with said pawl adjacent the ends thereof to limit movement of the pawl in the direction of said actuator, parts of said flanges defining cam surfaces each arranged for engagement with a respective end of said element when the arm is rocked in one direction about its pivot and adapted to swing the remote end of said element radially inwardly of the case.

6. In a turn-indicator device of the type including an oscillatable switch-actuating arm provided with an upstanding pivot, a spring-biased pawl rockable about and movable bodily radially relative to said pivot, said pawl having spaced shoulders adapted to engage a switch-operating member, a pair of stationary cam members in front of and engageable with said pawl in one position thereof to limit movement of the pawl in the direction of said switch-operating member so as to assure that there is no interference between the pawl and said switch-operating member in the mentioned position of the pawl, said pawl being movable against one or the other of said cam members by actuation of said arm and the engaged cam member being operative to rock said pawl about said pivot so as to swing the distal end thereof inwardly into the path of said switch-operating member.

References Cited in the file of this patent
UNITED STATES PATENTS

| Number | Name | Date |
|---|---|---|
| 2,249,120 | Doane et al. | July 15, 1941 |
| 2,249,137 | Hill | July 15, 1941 |
| 2,269,499 | Wharam | Jan. 13, 1942 |
| 2,542,242 | Fuller | Feb. 20, 1951 |